United States Patent
Lee et al.

(10) Patent No.: US 10,956,154 B2
(45) Date of Patent: Mar. 23, 2021

(54) SIGNAL PROCESSING DEVICE AND METHOD

(71) Applicant: Samsung Electronics Co., Ltd., Suwon-si (KR)

(72) Inventors: Won-jae Lee, Suwon-si (KR); Jae-hyun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 15/741,670

(22) PCT Filed: Jul. 7, 2015

(86) PCT No.: PCT/KR2015/007002
§ 371 (c)(1),
(2) Date: Jan. 3, 2018

(87) PCT Pub. No.: WO2017/007044
PCT Pub. Date: Jan. 12, 2017

(65) Prior Publication Data
US 2018/0196668 A1    Jul. 12, 2018

(51) Int. Cl.
  *G06F 9/30*     (2018.01)
  *G06F 15/76*    (2006.01)
  *G06T 1/20*     (2006.01)

(52) U.S. Cl.
  CPC ............ *G06F 9/3001* (2013.01); *G06F 9/30* (2013.01); *G06F 9/30029* (2013.01); *G06F 15/76* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 4,045,782 A | * | 8/1977 | Anderson | G06F 9/226 710/5 |
| 4,402,044 A | * | 8/1983 | McDonough | G06F 9/223 257/203 |
| 4,489,395 A | * | 12/1984 | Sato | G06F 13/4018 712/38 |
| 5,005,121 A | * | 4/1991 | Nakada | G06F 13/285 710/26 |
| 5,524,250 A | * | 6/1996 | Chesson | G06F 9/3851 712/228 |

(Continued)

FOREIGN PATENT DOCUMENTS

| | | |
|---|---|---|
| JP | 2003-015785 A | 1/2003 |
| JP | 2010-079362 A | 4/2010 |

(Continued)

OTHER PUBLICATIONS

Korean Office Action dated Nov. 15, 2018, issued in Korean Patent Application No. 10-2017-7037532.

(Continued)

*Primary Examiner* — Corey S Faherty
(74) *Attorney, Agent, or Firm* — Jefferson IP Law, LLP

(57) ABSTRACT

A signal processing apparatus includes a memory; a processor comprising arithmetic logic units (ALUs); and a hardware accelerator configured to perform an arithmetic logic operation by using shared ALUs that are not used by the processor among the ALUs.

16 Claims, 11 Drawing Sheets

(56) References Cited

U.S. PATENT DOCUMENTS

| | | | |
|---|---|---|---|
| 5,784,634 A * | 7/1998 | Worrell | G06F 9/3867 |
| | | | 712/1 |
| 5,809,326 A * | 9/1998 | Nogami | G06F 9/381 |
| | | | 712/233 |
| 6,462,837 B1 * | 10/2002 | Tone | H04N 1/407 |
| | | | 358/3.01 |
| 8,009,172 B2 | 8/2011 | Jiao et al. | |
| 8,217,951 B2 | 7/2012 | Jung | |
| 8,239,442 B2 | 8/2012 | Lerner | |
| 8,250,578 B2 | 8/2012 | Krishnamurthy et al. | |
| 8,572,299 B2 | 10/2013 | Pross et al. | |
| 8,773,459 B2 * | 7/2014 | Jiao | G06T 15/005 |
| | | | 345/418 |
| 2006/0059494 A1 | 3/2006 | Wexler et al. | |
| 2014/0078159 A1 | 3/2014 | Sprangle et al. | |
| 2017/0270056 A1 | 9/2017 | Chung et al. | |

FOREIGN PATENT DOCUMENTS

| | | |
|---|---|---|
| JP | 2014-053033 A | 3/2014 |
| KR | 10-2009-0011574 A | 2/2009 |
| KR | 10-2009-0079241 A | 7/2009 |
| KR | 10-2017-0108713 A | 9/2017 |

OTHER PUBLICATIONS

Korean Notice of Allowance with English translation dated Apr. 25, 2019; Korean Appln. No. 10-2017-7037532.

* cited by examiner

SIGNAL PROCESSING DEVICE AND METHOD

TECHNICAL FIELD

The embodiments relate to signal processing apparatuses and methods.

BACKGROUND ART

Recently, various image processing algorithms have been developed owing to a continuous development of image quality improvement technology. When an algorithm for improving image quality of a high resolution image such as an ultra high definition (UHD) image is applied to the UHD image, processing in real time is impossible by using a large number of processors due to a large amount of data and calculation amount, and the algorithm is processed by using at least one hardware accelerator.

Hardware accelerators are designed to process commonly used functions or operations in order to improve a processing performance of processors and increase speed of the processors. For example, a hardware accelerator may perform operations of calculating a mean, a standard deviation, and minimum/maximum values.

DETAILED DESCRIPTION OF THE INVENTION

Technical Problem

An embodiment relates to signal processing apparatuses and methods utilizing an arithmetic logic unit (ALU) of a processor.

Technical Solution

An embodiment provides a signal processing apparatus including: a memory; a processor comprising arithmetic logic units (ALUs); and a hardware accelerator configured to perform an arithmetic logic operation by using shared ALUs that are not used by the processor among the ALUs.

MODE FOR INVENTION

Figure 1:
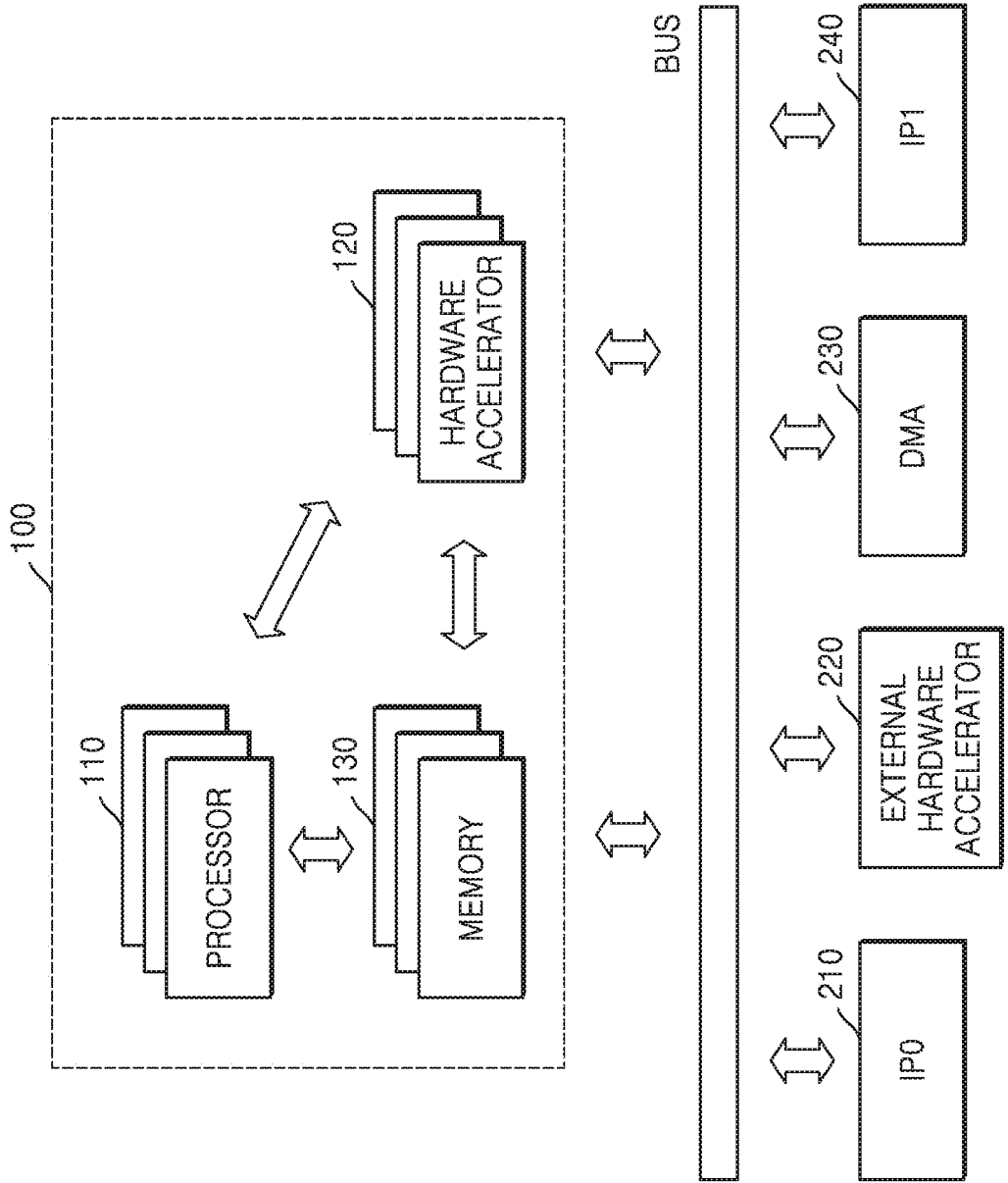
FIG. 1 is a diagram for explaining a signal processing apparatus according to an embodiment.

An embodiment provides a signal processing apparatus comprising: a memory; a processor comprising arithmetic logic units (ALUs); and a hardware accelerator configured to perform an arithmetic logic operation by using shared ALUs that are not used by the processor among the ALUs.

The processor further comprises a selector configured to select any one of an input of the processor and an input of the hardware accelerator, and the selector is connected to an input end of the shared ALUs.

The hardware accelerator further comprises an ALU controller configured to control the shared ALUs and the selector.

The ALU controller allocates arithmetic logic operations to be performed by the shared ALUs, and designates an input to be selected by the selector.

During a control operation of the processor, the hardware accelerator is configured to perform the arithmetic logic operation by using the shared ALUs.

The hardware accelerator is configured to perform the arithmetic logic operation by using the shared ALUs while the processor is connected to a memory or sets a parameter.

The processor is one of an array processor or a single instruction multiple data (SIMD) processor.

The arithmetic logic operation is at least one of addition, subtraction, multiplication, and division.

An embodiment provides a signal processing method comprising: performing a control operation, wherein the performing is performed by a processor; and while the control operation is performed by the processor, performing an arithmetic logic operation by using shared ALUs that are not used by the processor, wherein the performing is performed by a hardware accelerator.

The performing of the arithmetic logic operation further comprises: designating arithmetic logic operations to be performed by the shared ALUs; receiving input values from the hardware accelerator, wherein the receiving is performed by the shared ALUs; and performing the designated arithmetic logic operations with respect to the input value, wherein the performing is performed by the shared ALUs.

The performing of the arithmetic logic operation further comprises: while the processor is connected to a memory or sets a parameter, performing the arithmetic logic operation by using the shared ALUs, wherein the performing is performed by the hardware accelerator.

The signal processing method further comprises: performing a setting of the hardware accelerator, wherein the performing is performed by the processor, and the hardware accelerator performs the arithmetic logic operation after the setting is completed.

The signal processing method further comprises: performing an arithmetic logic operation, wherein the performing is performed by the processor; and integrating the arithmetic logic operation performed by the processor and the arithmetic logic operation performed by the hardware accelerator.

The signal processing method further comprises: performing the arithmetic logic operation by using an ALU included in the hardware accelerator, wherein the performing is performed by the hardware accelerator.

The hardware accelerator performs only an independent arithmetic logic operation by using the shared ALUs.

FIG. 1 is a diagram for explaining a signal processing apparatus 100 according to an embodiment. Referring to FIG. 1, the signal processing apparatus 100 includes a processor 110, a hardware accelerator 120, and a memory 130. The processor 110 and the hardware accelerator 120 may share an arithmetic logic unit (ALU). For example, the hardware accelerator 120 may process an assigned arithmetic logic operation by using ALUs included in the processor 110. Therefore, when the signal processing apparatus 100 is produced, some of ALUS in the hardware accelerator 120 may be removed, and thus the hardware accelerator 120 may be downsized.

The processor 110 includes a plurality of ALUs and a register and the like. The plurality of ALUs processes arithmetic logic operations assigned to the processor 110. The processor 110 may be connected to the memory 130 or set a parameter before processing the assigned arithmetic logic operations. Hereinafter, an operation in which the processor 110 is connected to the memory 130 or sets the parameter is referred to as a control operation, and an operation in which the processor 110 processes the assigned arithmetic logic operation is referred to as an arithmetic logic operation. The control operation may be a preparatory operation for processing the arithmetic logic operation. The arithmetic logic operation is an operation in which the processor 110 processes the arithmetic logic operation by using the ALUs. The processor 110 may start the control operation after completing setting of the hardware accelerator 120. For example, the processor 110 may start the control operation after the hardware accelerator 120 has allocated an arithmetic logic operation to process.

The hardware accelerator 120 performs the arithmetic logic operation by using the ALUs included in the processor 110. Although the hardware accelerator 120 may also include ALUs, the arithmetic logic operation that may be processed by using the ALUs included in the processor 110 may be performed by the ALUs included in the processor 110, other than the ALSU of the hardware accelerator 120. Accordingly, the number of the ALUs included in the hardware accelerator 120 may be reduced.

The memory 130 stores data. The memory 130 may store data processed in the processor 110 and data processed in the hardware accelerator 120.

The signal processing apparatus 100 may be connected to external devices. For example, the signal processing apparatus 100 may be connected to an IP0 210, an external hardware accelerator 220, a DMA 230, and an IP1 240 and the like. The external hardware accelerator 220 is located outside the signal processing apparatus 100.

Figure 2:
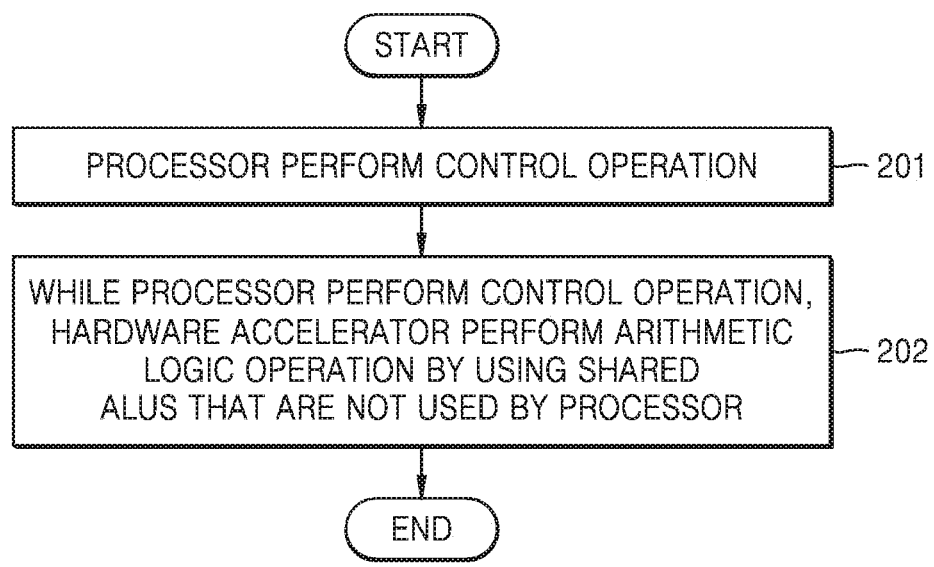
FIG. 2 is a flowchart for explaining a signal processing method according to an embodiment.

FIG. 2 is a flowchart for explaining a signal processing method according to an embodiment. Referring to FIG. 2, the hardware accelerator 120 may use shared ALUs included in the processor 110.

In step 201, the processor 110 performs a control operation. As described above, the control operation represents an operation in which the processor 110 is connected to the memory 130, sets a parameter, sets the hardware accelerator 120, and the like.

In step 202, while the processor 110 performs the control operation, the hardware accelerator 120 performs an arithmetic logic operation by using the shared ALUs that are not used by the processor 110. The shared ALUs are ALUs that are available to the processor 110 and the hardware accelerator 120. The shared ALUs are at least one ALUS among one or more ALUs included in the processor 110.

When the processor 110 performs the control operation, all of the ALUs included in the processor 110 are not used. Accordingly, there are idle ALUs among the ALUs included in the processor 110, and the hardware accelerator 120 may utilize resources of the processor 110 by performing an assigned arithmetic logic operation by using the idle ALUs.

The hardware accelerator 120 may perform an arithmetic logic operation performed in an image processing algorithm such as a mean, a standard deviation, minimum/maximum values, and the like. The hardware accelerator 120 may also perform an arithmetic logic operation such as a finite impulse response (FIR) filter or a Huffman encoder/decoder, etc.

The hardware accelerator 120 may perform some of arithmetic logic operations in a shared ALU. For example, the hardware accelerator 120 may perform four arithmetic logic operations (addition, subtraction, multiplication, and division) by using the shared ALU. Accordingly, the hardware accelerator 120 may transmit data to the shared ALU and receive a result of the four arithmetic logic operations from the shared ALU. The hardware accelerator 120 may directly perform a square root operation or the like.

Figure 3:
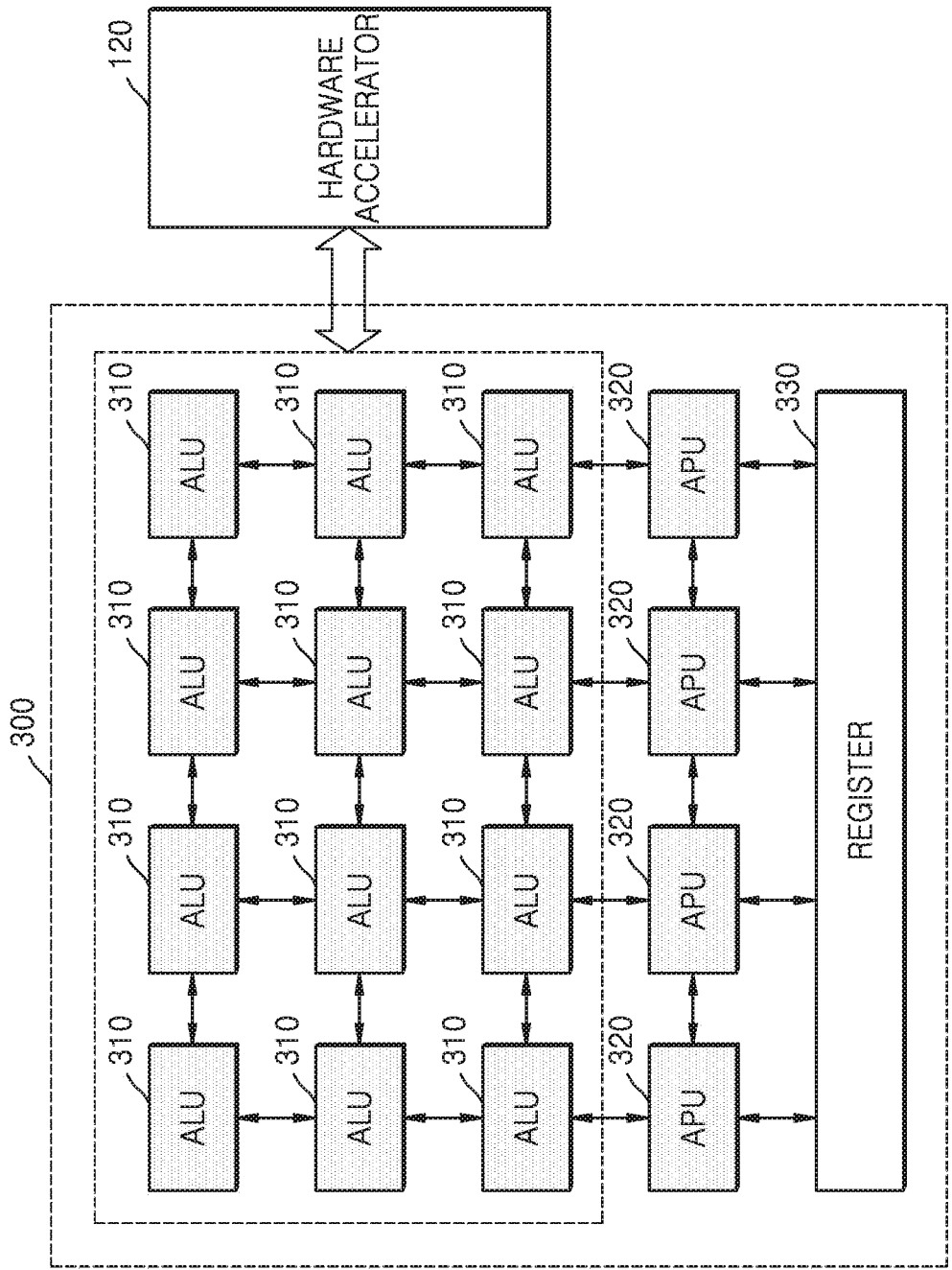
FIG. 3 is a diagram for explaining a method of using arithmetic logic units (ALUs) of an array processor.

FIG. 3 is a diagram for explaining a method of using ALUs of an array processor 300. FIG. Referring to FIG. 3, the hardware accelerator 120 may perform an arithmetic logic operation by using a shared ALU 310 of the array processor 300.

The array processor 300 includes 16 ALUs 310 and 320 and a register 330. FIG. 3 merely illustrates n example in which the array processor 300 includes the 16 ALUs 310 and 320, and the number of ALUs included in the array processor 300 is not limited to 16. The 16 ALUs 310 and 320 may be connected to each other to transmit and receive data.

The array processor 300 may use only the four ALUs 320 during a control operation. Thus, the 12 ALUs 310 are in an idle state. The Idle ALUs 310 are shared ALUs and are available to the hardware accelerator 120. Although FIG. 3 illustrates the 4 shared ALUs 320 and the 12 shared ALUs 310, the number of the ALUs 320 and the number of the ALUs 310 are limited to 4 and 12, respectively. The shared ALUs 310 may be ALUs that are not directly connected to the register 330. The processor 110 may perform the control operation by using the 4 ALUs 320 directly connected to the register 330. ALUs that are not directly connected to the register 330 may be used by the hardware accelerator 120 during the control operation of the processor 110.

Figure 4:
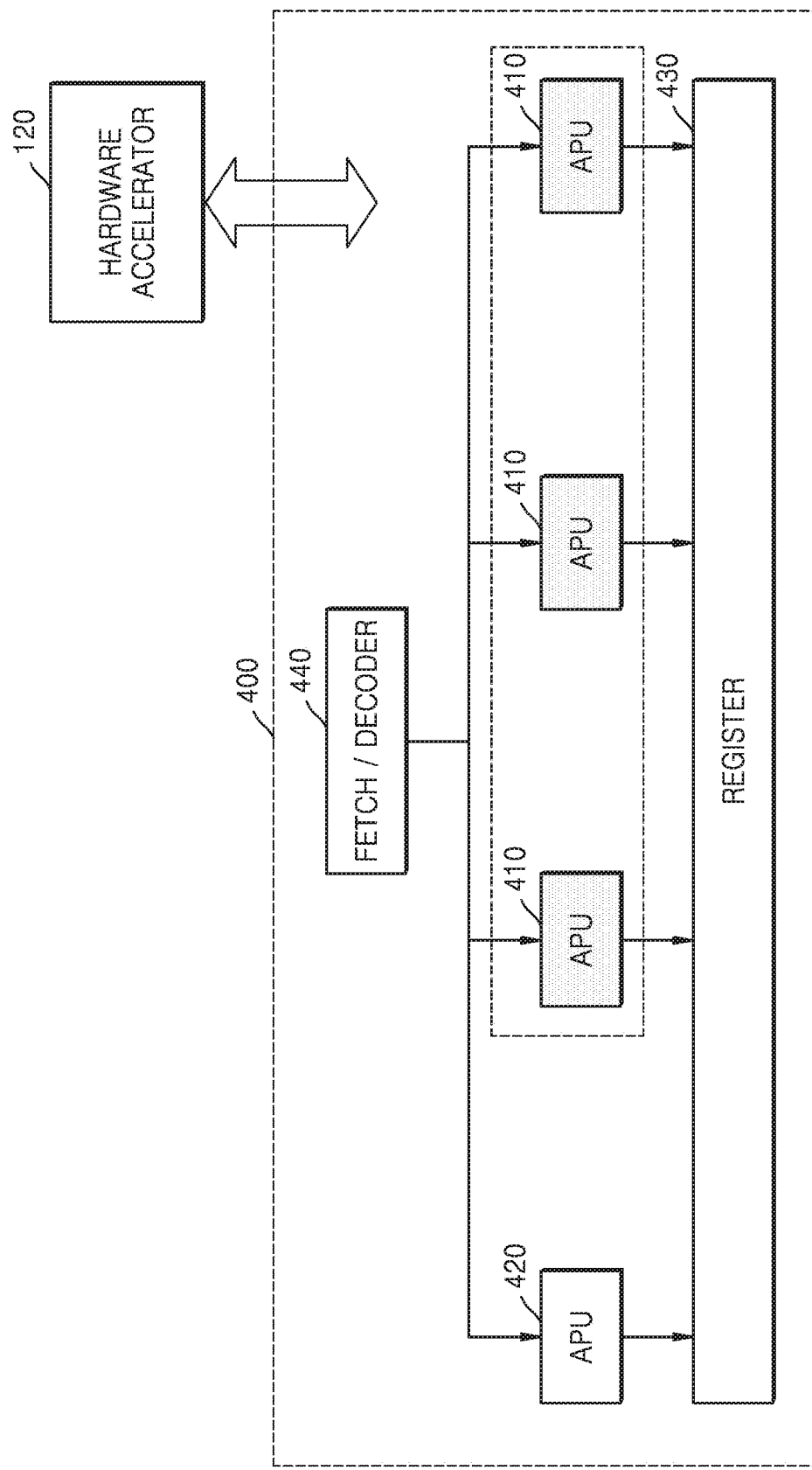
FIG. 4 is a diagram for explaining a method of using ALUs of a single instruction multiple data (SIMD) processor.

FIG. 4 is a diagram for explaining a method of using ALUs of a single instruction multiple data (SIMD) processor 400. Referring to FIG. 4, the hardware accelerator 120 may perform an arithmetic logic operation by using a shared ALU 410 of the SIMD processor 400.

The SIMD processor 400 includes 4 ALUs 410 and 420, a register 330, and a fetch/decoder 440. The 4 ALUs 410 and 420 are arranged in parallel. The SIMD processor 400 may simultaneously process multiple data with one instruction. The 4 ALUs 410 and 420 are all connected to the register 430 and the fetch/decoder 440.

FIG. 4 illustrates only an example in which the SIMD processor 400 includes the 4 ALUs 410 and 420, and the number of ALUs included in the SIMD processor 400 is not limited to 4.

During a control operation, the SIMD processor 400 may use only the one ALU 420. Therefore, the remaining 3 ALUs 410 become in an idle state. The idle ALUs 410 are shared ALUs and may be used by the hardware accelerator 120. Although FIG. 4 exemplifies a case where there are the one ALU 420 and the 3 shared ALUs 410, the number of the ALUs 420 and the shared ALUs 410 is not limited to 1 and 3, respectively.

Figure 5:
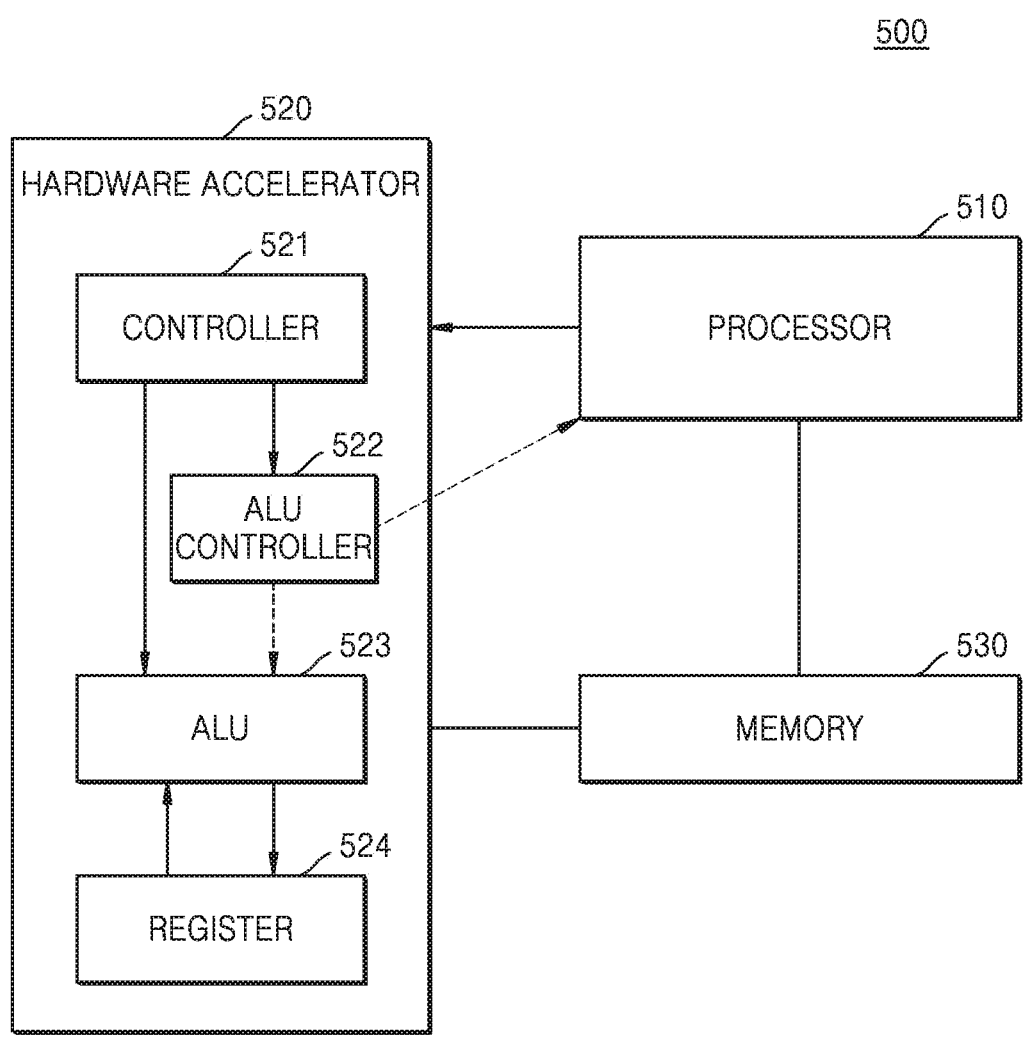
FIG. 5 is a block diagram illustrating a signal processing apparatus according to an embodiment.

FIG. 5 is a block diagram illustrating a signal processing apparatus 500 according to an embodiment. Referring to FIG. 5, a hardware accelerator 520 includes a controller 521, an ALU controller 522, an ALU 523, and a register 524.

The controller 521 controls the ALU 523 and the ALU controller 522. The controller 521 may distinguish an arithmetic logic operation to be performed in the hardware accelerator 520 and an arithmetic logic operation to be performed in the processor 510. The controller 521 allocates the arithmetic logic operation to be performed in the hardware accelerator 520 to the ALU 523 and allocates the arithmetic logic operation to be performed in the processor 510 to the ALU controller 522.

The ALU controller 522 controls a shared ALU included in the processor 510. The ALU controller 522 controls shared ALUs to perform some of arithmetic logic operations assigned to the hardware accelerator 520.

The ALU controller 522 identifies the shared ALUs and allocates arithmetic logic operations to be performed by the respective shared ALUs. For example, the ALU controller 522 may assign arithmetic logic operations such as addition, subtraction, multiplication, and division to the shared ALUs. The ALU controller 522 may allocate only arithmetic logic operations having no dependency to the shared ALUs.

Data input to the shared ALUs may be data stored in the register 524. The shared ALUs receive the data from the register 524 and perform the arithmetic logic operations assigned by the ALU controller 522. The shared ALUs output a result of the arithmetic logic operations to the hardware accelerator 520.

The ALU 523 may perform a final arithmetic logic operation by using the result of the arithmetic logic operations received from the shared ALUs. The arithmetic logic operations performed in the shared ALUs and the arithmetic logic operation performed in the ALU 523 may have dependency. If there is the dependency, the ALU 523 stands by until the arithmetic logic operations of the shared ALUs are completed and perform the final arithmetic logic operation after receiving the of the arithmetic logic operations from the shared ALUs.

Figure 6:
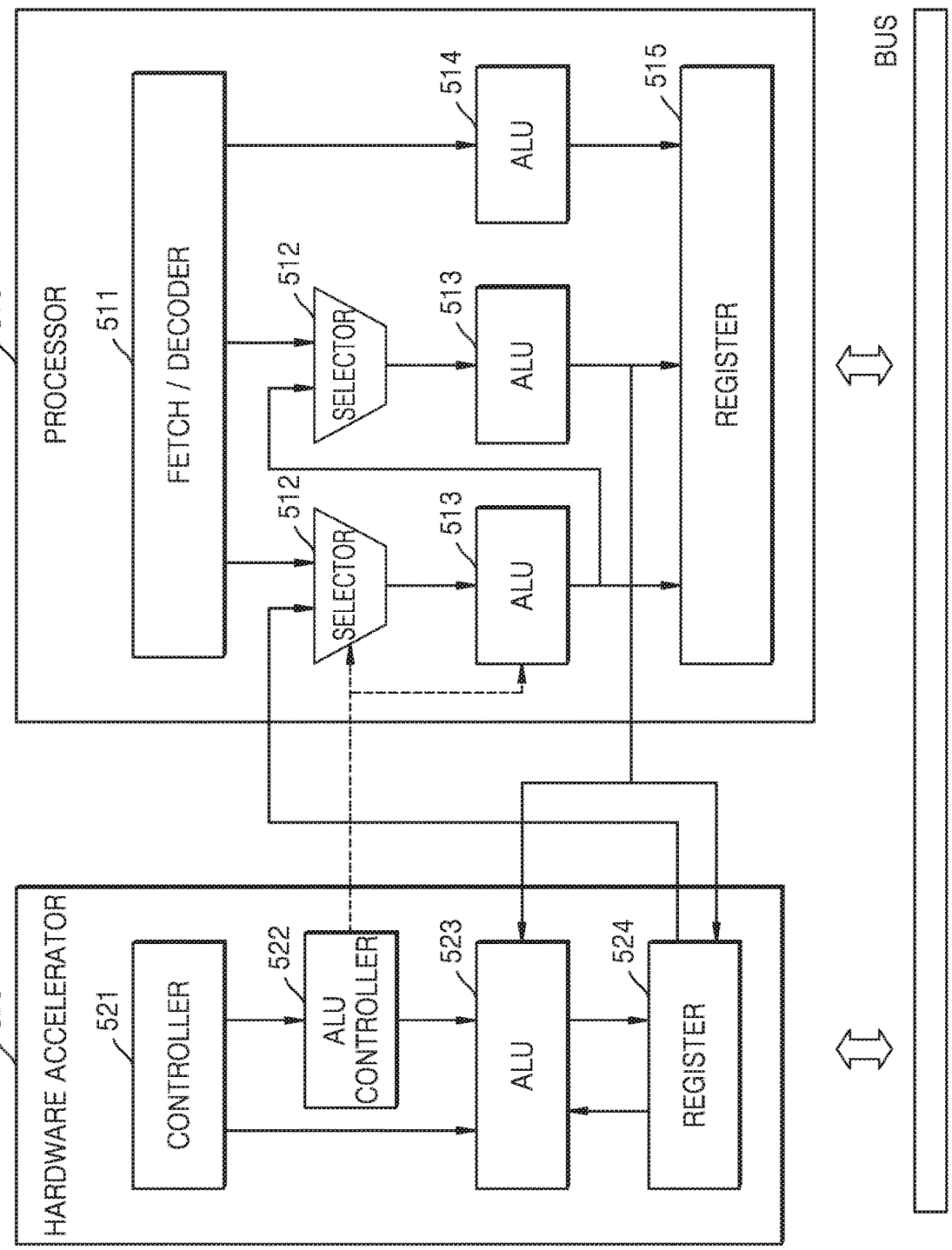
FIG. 6 is a block diagram for explaining a signal processing apparatus according to another embodiment.

FIG. 6 is a block diagram for explaining the signal processing apparatus 500 according to another embodiment. Referring to FIG. 6, the hardware accelerator 520 may perform an arithmetic logic operation by using an ALU 513.

The hardware accelerator 520 includes the ALU controller 522. The ALU controller 522 controls a selector 512 and an ALU 513 included in the processor 510. The ALU controller 522 controls the selector 512 to select data received from the hardware accelerator 520 among data input to the selector 512. The ALU controller 522 allocates an arithmetic logic operation to be performed by the ALU 513. The ALU controller 522 may control the ALUs 513 such that each of the ALUs 513 performs the same arithmetic logic operation or different arithmetic logic operations.

The ALU controller 522 controls the selector 512 and the shared ALU 513 during a control operation of the processor 510.

The processor 510 includes the shared ALU 513 and a non-shared ALU 514. The shared ALU 513 is an ALU used by the hardware accelerator 520 and the processor 510. The non-shared ALU 514 is an ALU used only by the processor 510.

The selector 512 may be connected to an input end of the shared ALUs 513. The selector 512 selects one of the data input according to control of the hardware accelerator 520 or the processor 510 and outputs the data to the ALU 513.

The shared ALU 513 may output a result of an arithmetic logic operation to the register 515, the other shared ALU 513, or the like. Alternatively, the shared ALU 513 may output the result of the arithmetic logic operation to the ALU 523 of the hardware accelerator 520 or the register 524.

The ALU 523 of the hardware accelerator 520 performs the arithmetic logic operation by using data output from the register 524 and the shared ALU 513.

Figure 7:
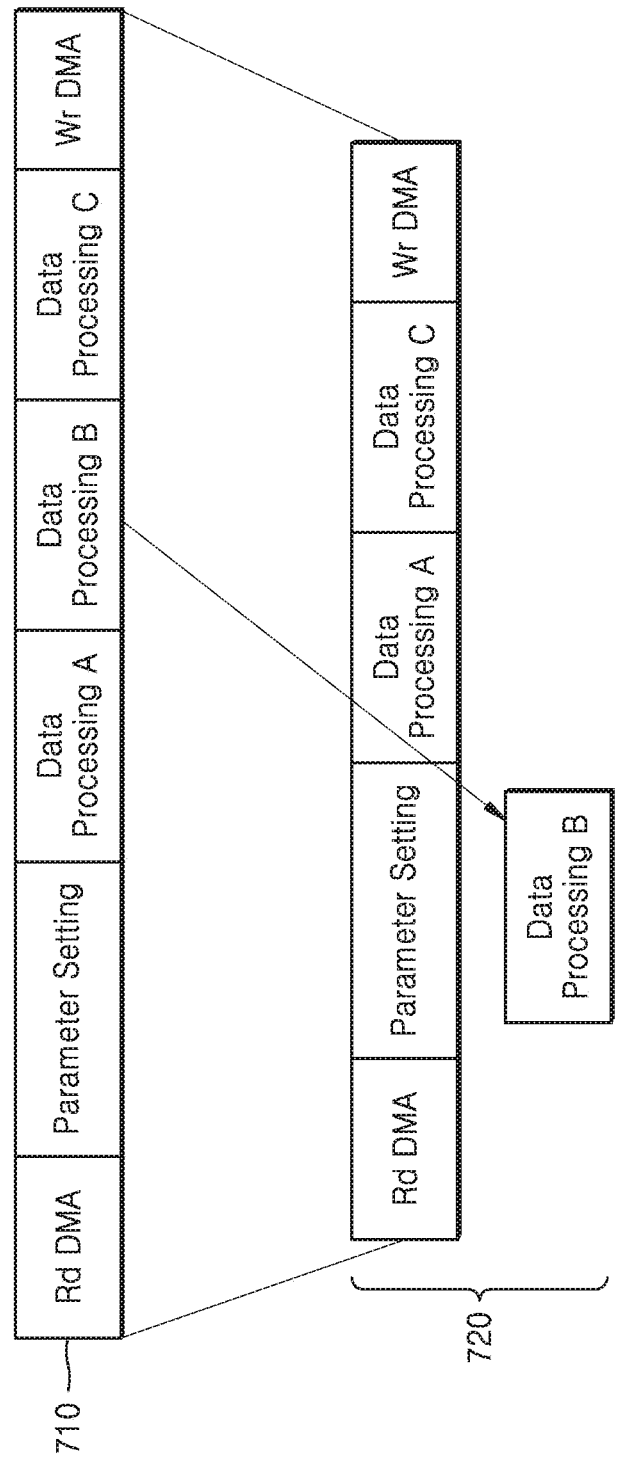
FIG. 7 is a diagram for explaining a workflow of a signal processing apparatus.

FIG. 7 is a diagram for explaining a workflow of a signal processing apparatus. Referring to FIG. 7, a workflow A 710 represents a case where a work is performed sequentially, and a workflow B 720 represents a case where the processor 110 and the hardware accelerator 120 perform works in parallel.

When the workflow A 710 and the workflow B 720 are compared, there is a difference in the order of execution of data processing B. In the workflow A 710, the data processing B is performed sequentially as in other arithmetic logic operations, while in the workflow B 720, the data processing B is performed in parallel with Rd DMA and parameter setting arithmetic logic operations. More specifically, in the workflow B 720, the hardware accelerator 120 performs the data processing B while the processor 110 performs the Rd DMA and parameter setting arithmetic logic operations.

While the processor 110 performs the Rd DMA and parameter setting arithmetic logic operations, some of ALUs in the processor 110 are not used. Accordingly, the hardware accelerator 120 may perform the data processing B by using an unused ALU.

Figure 8:
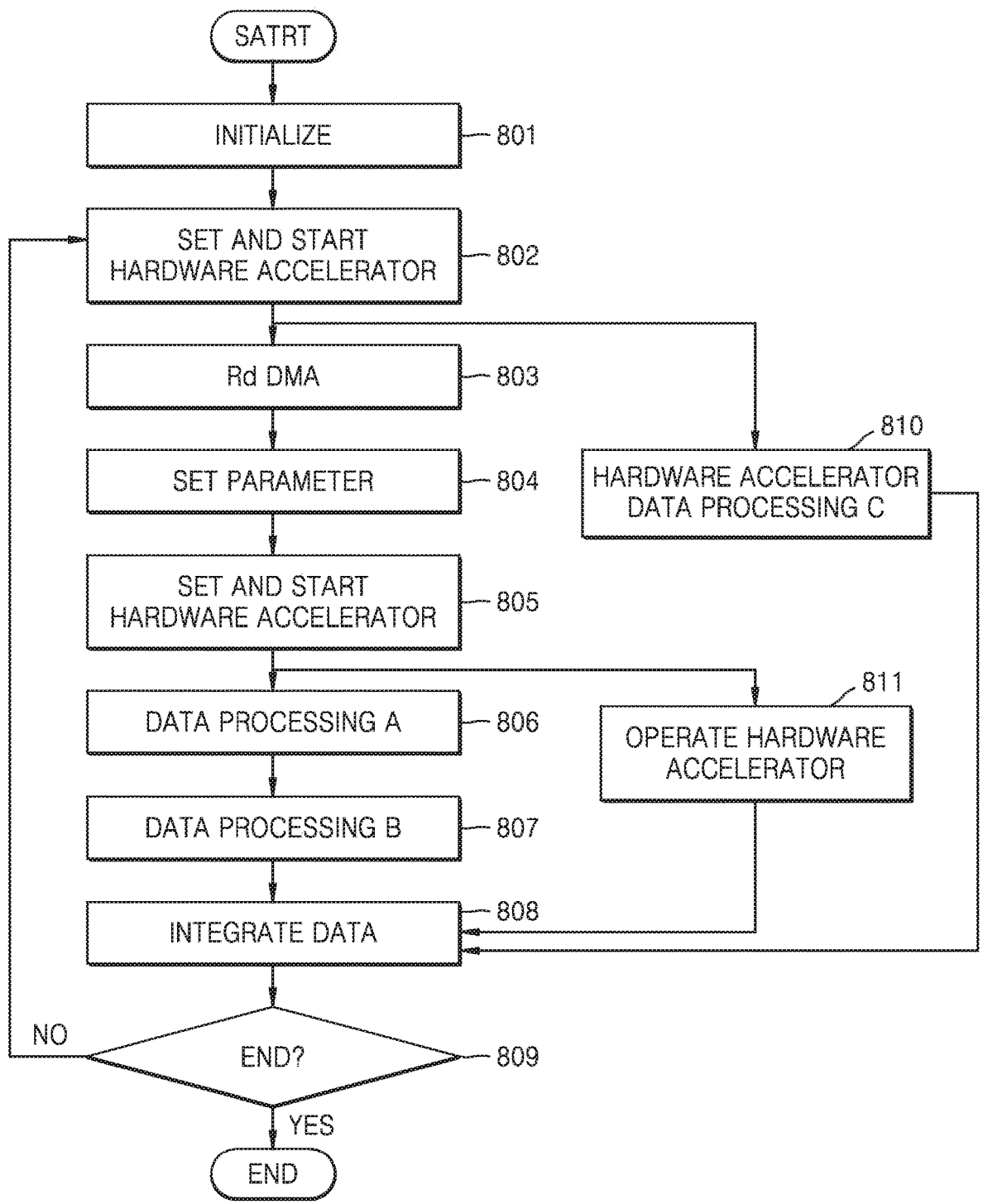
FIG. 8 is a flowchart for explaining an operation of a signal processing apparatus.

FIG. 8 is a flowchart for explaining an operation of the signal processing apparatus 100. Steps 801 to 805 are control steps. Steps 806 to 808 are data processing steps.

In step 801, the processor 110 performs initialization.

In step 802, the processor 110 performs setting of the hardware accelerator 120 and controls the hardware accelerator 120 to start its operation.

In step 810, the hardware accelerator 120 performs data processing C under control of the processor 110. Since the processor 110 is during a control operation, the hardware accelerator 120 may perform data processing C by using a shared ALU that is not used by the processor 110.

In step 803, the processor 110 is connected to the memory 130. In step 804, the processor 110 sets a parameter.

In step 805, the processor 110 performs the setting of the hardware accelerator 120 and controls the hardware accelerator 120 to start its operation.

In step 811, the hardware accelerator 120 performs an assigned arithmetic logic operation. In step 811, since the processor 110 is processing data, the hardware accelerator 120 may not use the shared ALU. Thus, in step 811, the hardware accelerator 120 processes the data by using an ALU inside the hardware accelerator 120.

In step 806, the processor 110 performs data processing A.
In step 807, the processor 110 performs data processing B.
In step 808, the processor 110 integrates the data. The processor 110 integrates results of data processing A, B, and C.

In step 809, the processor 110 determines whether data processing has ended. If the data processing has not ended, a process proceeds to step 802.

Figure 9:
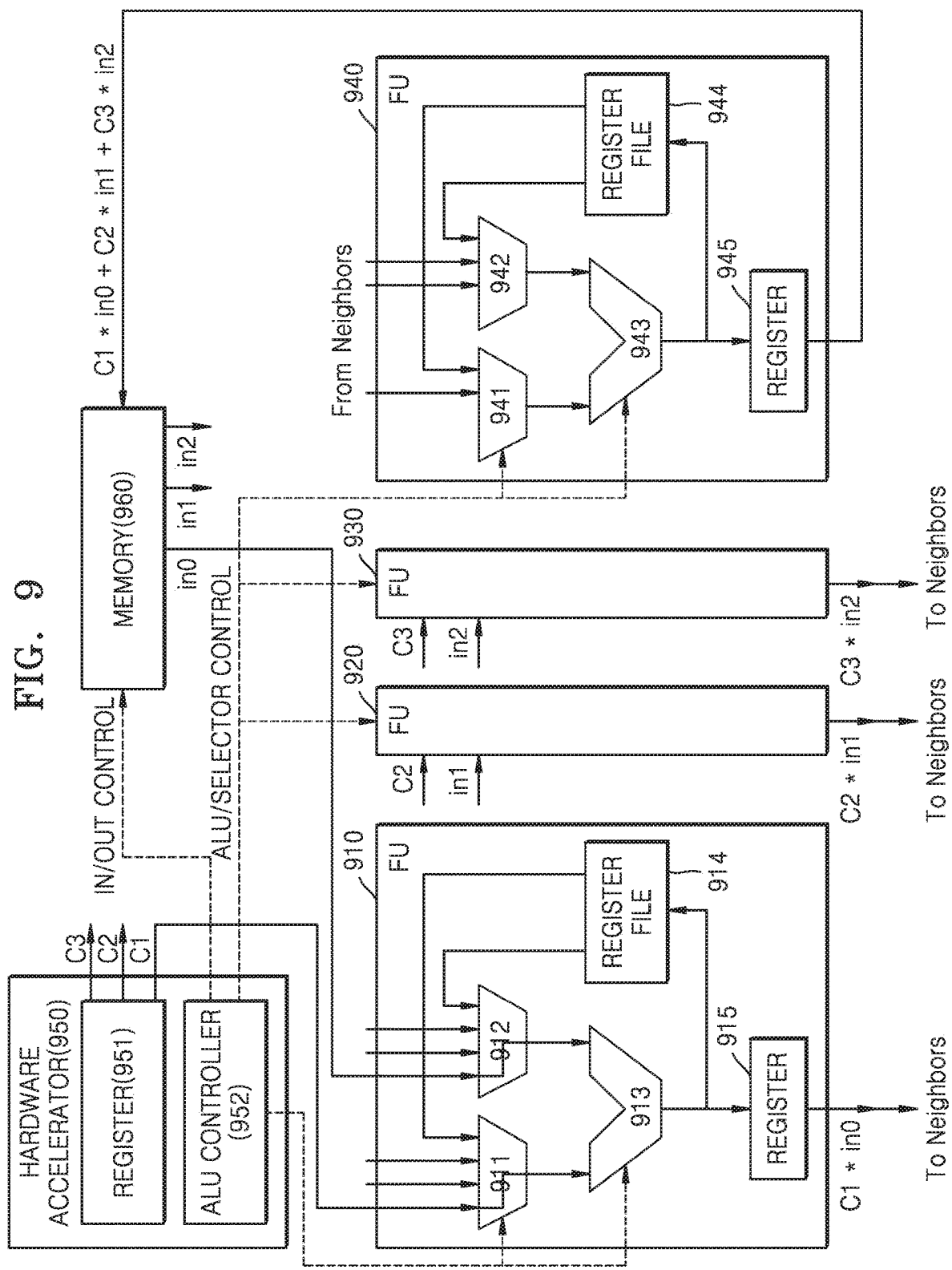
FIG. 9 is a diagram for explaining an arithmetic logic processing process.

FIG. 9 is a diagram for explaining an arithmetic logic processing process. Referring to FIG. 9, a hardware accelerator 950 performs an arithmetic logic operation $C1*in0+C2*in1+C3*in2$ by using FUs 910 to 940. FIG. 9 illustrates an example in which a 1D Filter is implemented by using the idle FUs 910 to 940 in an array processor.

A register 951 of the hardware accelerator 950 stores $C_1$, $C_2$, and $C_3$. The register 951 outputs $C_1$ to the FU 910, $C_2$ to the FU 920, and $C_3$ to the FU 930.

The memory 960 stores $in_0$, $in_1$, and $in_2$. The memory 960 outputs $in_0$ to the FU 910, $in_1$ to the FU 920, and $in_2$ to the FU 930.

An ALU controller 952 of the hardware accelerator 950 controls the FUs 910 to 940. For example, the ALU controller 952 controls a selector 911, a selector 912, and an ALU 913 of the FU 910. The ALU controller 952 may control the selectors 911 and 912 to select any one of inputs. The ALU controller 952 may designate an arithmetic logic operation to be performed by the ALU 913.

In FIG. 9, the selector 911 selects $C_1$ input from the register 951 under control of the ALU controller 952. The selector 912 selects $in_0$ input from the memory 960 under the control of the ALU controller 952. The ALU 913 performs a multiplication operation according to the ALU controller 952. Therefore, the ALU 913 calculates $C1*in0$. A calculation result is stored in a register file 914 and a register 915. The register 915 outputs the calculation result to the FU 940.

The FU 920 and the FU 930 respectively calculate $C2*in_1$ and $C3*in_2$ in the same manner as the FU 910 and output results to the FU 940.

The FU 940 adds all of the data received from the FUs 910 through 930. The selector 941 receives the calculation result of $C1*in_0$ from the FU 910. The selector 942 receives the calculation result of $C2*in_1$ from the FU 920. The ALU 943 calculates $C1*in_0+C2*in_1$.

A register file 944 outputs the calculation result of $C1*in_0+C2*in_1$ again to the selector 941. The selector 942 receives a calculation result of $C3*in_2$ from the FU 930. The ALU 943 calculates $C1*in_0+C2*in_1+C3*in_2$. A register 945 outputs a calculation result of $C1*in_0+C2*in_1+C3*in_2$ to the memory 960.

Figure 10:
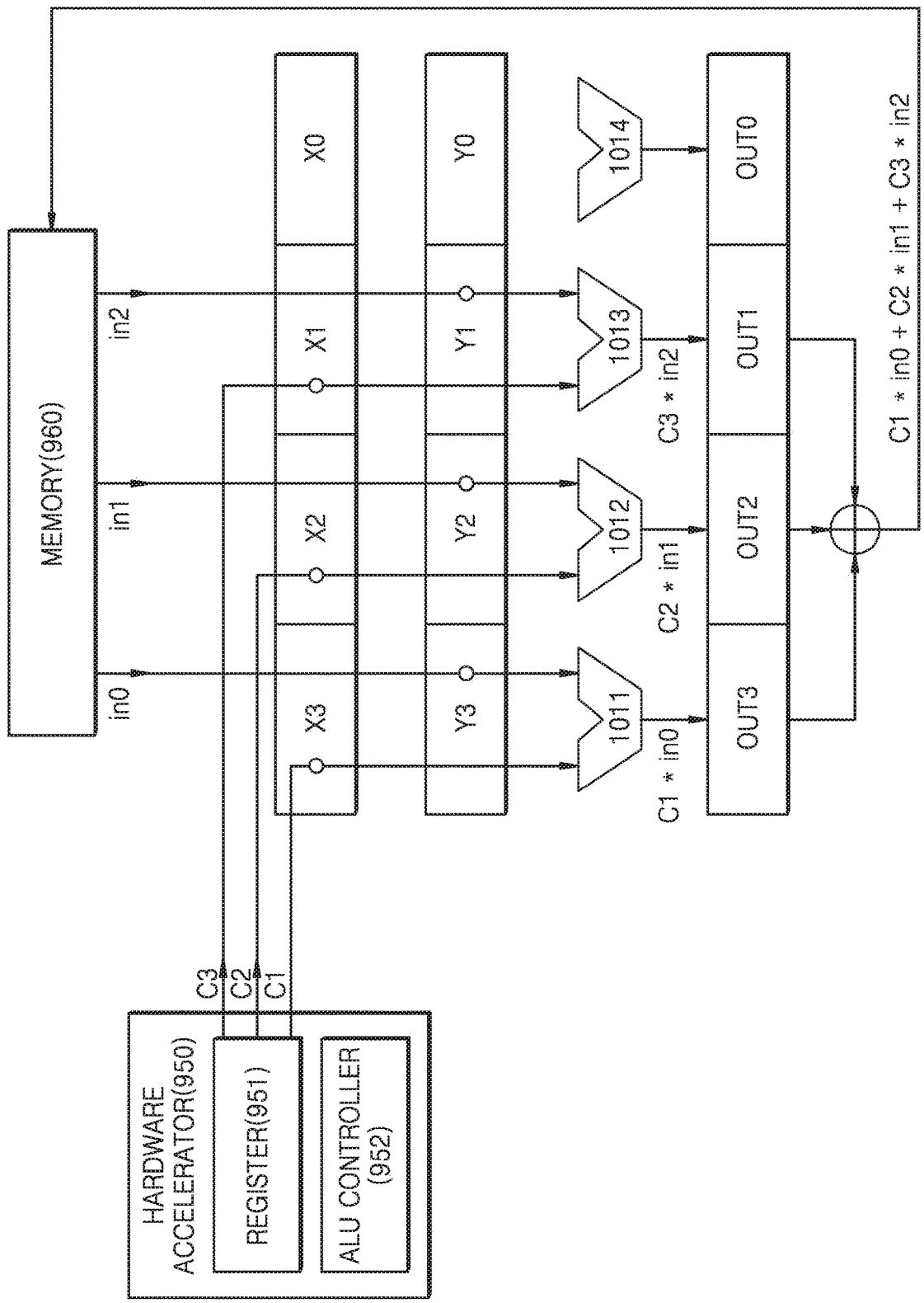
FIG. 10 is a diagram for explaining an arithmetic logic processing process.

FIG. 10 is a diagram for explaining an arithmetic logic processing process. Referring to FIG. 10, the hardware accelerator 950 performs an arithmetic logic operation $C_1*in_0+C_2*in_1+C_3*in_2$ by using 3 ALUs 1011 to 1013. FIG. 10 illustrates an example in which a 1D filter is implemented by using idle ALUs 1011 to 1014 in a SIMD processor.

A register 951 of the hardware accelerator 950 stores $C_1$, $C_2$, and $C_3$. The register 951 outputs $C_1$ to X3, $C_2$ to X2, and $C_3$ to X1.

The memory 960 stores $in_0$, $in_1$, and $in_2$. The memory 960 outputs in0 to Y3, $in_1$ to Y2, and $in_2$ to Y1.

The ALU 1011 multiplies $C_1$ received from X3 and $in_0$ received from Y3. The ALU 1011 outputs a multiplication result to OUT3.

The ALU 1012 multiplies $C_2$ received from X2 and $in_1$ received from Y2. The ALU 1011 outputs a multiplication result to OUT2.

The ALU 1013 multiplies $C_3$ received from X1 and $in_2$ received from Y1. The ALU 1013 outputs a multiplication result to OUT1.

The hardware accelerator 950 adds all of the multiplication results received from OUT1 to OUT3 to calculate $C_1*in_0+C_2*in_1+C_3*in_2$, and outputs a calculation result to the memory 960.

Figure 11:
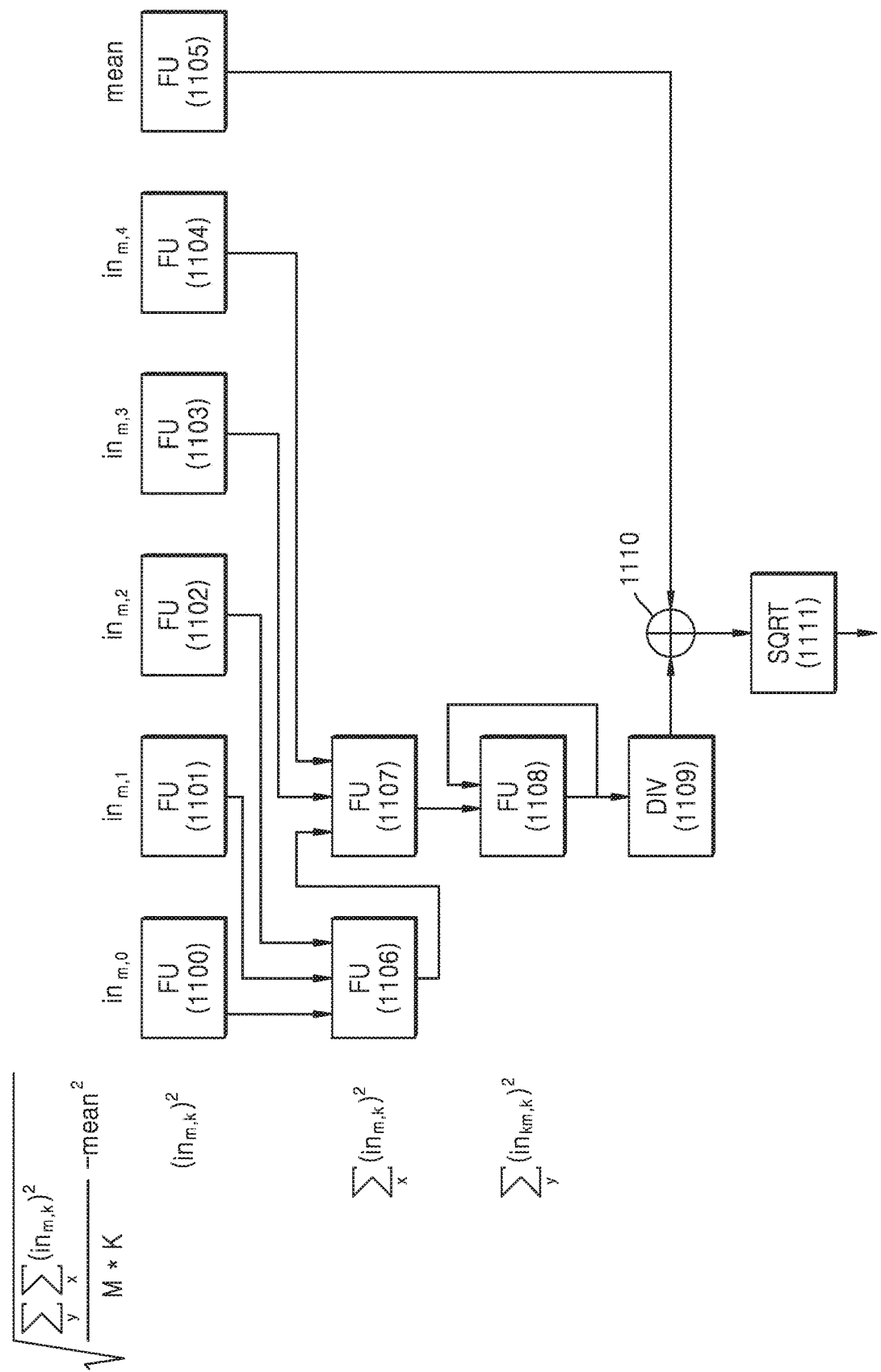
FIG. 11 is a diagram for explaining an arithmetic logic processing process.

FIG. 11 is a diagram for explaining an arithmetic logic processing process. Referring to FIG. 11, the hardware accelerator 120 may calculate a standard deviation by using FUs 1100 to 1108 of the processor 110. In FIG. 11, DIV/SQUARE ROOT and the like, which are difficult to perform in the processor 110, are performed in the hardware accelerator 120. The 9 FUs 1100 to 1108 are included in the processor 110. A DIV 1109, an ALU 1110 and a SQRT 1111 are included in the hardware accelerator 120.

The 9 FUs 1100 to 1108 may be assigned with arithmetic logic operations to be performed by the hardware accelerator 120. The 6 FUs 1100 to 1105 are assigned with square operations. The 3 FUs 1106 to 1108 are assigned with addition operations.

$in_{m,0}$ through $in_{m,4}$ are input to the FUs 1100 to 1104, respectively. A mean is input to the FU 1105. The FUs 1100 to 1105 square the input values and output resultant values.

The 3 FUs 1100 to 1102 output the resultant values to the FU 1106. The 2 FUs 1103 and 1104 output the resultant values to the FU 1107.

The FU 1106 adds $in_{m,0}$ through $in_{m,2}$, and outputs a resultant value to the FU 1107.

The FU 1107 adds the resultant value received from the FU 1106 and the resultant values received from the FU 1103 and 1104 and outputs a resultant value to the FU 1108.

The FU 1108 adds the resultant value received from the FU 1107 and the resultant value output from the FU 1108. In other words, the FU 1108 accumulates the resultant values received from the FU 1107.

The FU 1108 outputs an accumulated resultant value to the hardware accelerator 120. Also, the FU 1105 also outputs a result of squaring the mean to the hardware accelerator 120.

The DIV 1109 divides the resultant value received from the FU 1108 by M*K.

The ALU 1110 outputs a value obtained by subtracting the resultant value output from the FU 1105 from the resultant value output from the DIV 1109 to the SQRT 1111.

The SQRT 1111 calculates a square of the resultant value received from the ALU 1110.

Through the above process, the hardware accelerator 120 may calculate the standard deviation.

A signal processing apparatus according to an embodiment may perform an arithmetic logic operation by using an idle ALU, thereby reducing the total time of the arithmetic logic operation.

The signal processing apparatus according to an embodiment may reduce the number of ALUs included in a hardware accelerator, thereby reducing the size of the signal processing apparatus.

The device described herein may include a processor, a memory for storing and executing program data, a permanent storage such as a disk drive, a communication port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium may also be distributed over network coupled computer systems so that the computer readable code is stored and executed in a distributed fashion. The media may be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present disclosure could employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a" and "an", and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the present disclosure.

The invention claimed is:

1. A signal processing apparatus comprising:
a memory;
a processor comprising an array of shared arithmetic logic units (ALUs); and
a hardware accelerator configured to:
identify shared ALUs that are not currently used by the processor, and
perform an arithmetic logic operation by using one or more of the identified shared ALUs that are not used by the processor among the shared ALUs,
wherein the array of shared ALUs is configured to allow selective use of each shared ALU of the array.

2. The signal processing apparatus of claim 1,
wherein the processor further comprises a selector configured to select any one of an input of the processor and an input of the hardware accelerator, and
wherein the selector is connected to an input end of the shared ALUs.

3. The signal processing apparatus of claim 2, wherein the hardware accelerator further comprises an ALU controller configured to control the shared ALUs and the selector.

4. The signal processing apparatus of claim 3, wherein the ALU controller is further configured to:
allocate arithmetic logic operations to be performed by the shared ALUs, and
designate an input to be selected by the selector.

5. The signal processing apparatus of claim 1, wherein during a control operation of the processor, the hardware accelerator is further configured to perform the arithmetic logic operation by using the shared ALUs.

6. The signal processing apparatus of claim 1, wherein the hardware accelerator is further configured to perform the arithmetic logic operation by using the shared ALUs while the processor is connected to a memory or sets a parameter.

7. The signal processing apparatus of claim 1, wherein the processor is one of an array processor or a single instruction multiple data (SIMD) processor.

8. The signal processing apparatus of claim 1, wherein the arithmetic logic operation is at least one of addition, subtraction, multiplication, or division.

9. A signal processing method comprising:
performing a control operation by a processor comprising an array of shared arithmetic logic units (ALUs); and
while the control operation is performed by the processor, identifying shared ALUs that are not currently used by the processor, and
performing an arithmetic logic operation by using one or more of the identified shared ALUs that are not used by the processor among the shared ALUs,
wherein the arithmetic logic operation is performed by a hardware accelerator, and
wherein the array of shared ALUs is configured to allow selective use of each shared ALU of the array.

10. The signal processing method of claim 9, wherein the performing of the arithmetic logic operation further comprises:
designating arithmetic logic operations to be performed by the shared ALUs;
receiving input values from the hardware accelerator by the shared ALUs; and
performing the designated arithmetic logic operations with respect to the input value by the shared ALUs.

11. The signal processing method of claim 9,
wherein the performing of the arithmetic logic operation further comprises, while the processor is connected to a memory or sets a parameter, performing the arithmetic logic operation by using the shared ALUs, and
wherein the arithmetic logic operation is performed by the hardware accelerator.

12. The signal processing method of claim 9, further comprising:
performing a setting of the hardware accelerator by the processor, wherein the hardware accelerator performs the arithmetic logic operation after the setting is completed.

13. The signal processing method of claim 9, further comprising:
performing an arithmetic logic operation by the processor; and
integrating the arithmetic logic operation performed by the processor and the arithmetic logic operation performed by the hardware accelerator.

14. The signal processing method of claim 9, further comprising:
performing the arithmetic logic operation by using an ALU included in the hardware accelerator,
wherein the arithmetic logic operation is performed by the hardware accelerator.

15. The signal processing method of claim 9, wherein the hardware accelerator is configured to perform only an independent arithmetic logic operation by using the shared ALUs.

16. A non-transitory computer-readable recording medium having recorded thereon a program which, when executed by a computer, performs the method of claim 9.

* * * * *